United States Patent
Ji et al.

(10) Patent No.: US 11,987,236 B2
(45) Date of Patent: May 21, 2024

(54) MONOCULAR 3D OBJECT LOCALIZATION FROM TEMPORAL AGGREGATION

(71) Applicant: NEC Laboratories America, Inc., Princeton, NJ (US)

(72) Inventors: Pan Ji, San Jose, CA (US); Buyu Liu, Cupertino, CA (US); Bingbing Zhuang, San Jose, CA (US); Manmohan Chandraker, Santa Clara, CA (US); Xiangyu Chen, Ithaca, NY (US)

(73) Assignee: NEC Corporation, Tokyo (JP)

( * ) Notice: Subject to any disclaimer, the term of this patent is extended or adjusted under 35 U.S.C. 154(b) by 386 days.

(21) Appl. No.: 17/408,911

(22) Filed: Aug. 23, 2021

(65) Prior Publication Data

US 2022/0063605 A1 Mar. 3, 2022

Related U.S. Application Data

(60) Provisional application No. 63/072,428, filed on Aug. 31, 2020.

(51) Int. Cl.
*G06K 9/00* (2022.01)
*B60W 30/09* (2012.01)
(Continued)

(52) U.S. Cl.
CPC ........ *B60W 30/09* (2013.01); *B60W 30/0956* (2013.01); *G06F 18/2193* (2023.01);
(Continued)

(58) Field of Classification Search
CPC ................... G06T 7/215; G06T 7/251; G06T 2207/20084; G06T 2207/30261
See application file for complete search history.

(56) References Cited

U.S. PATENT DOCUMENTS 10,423,860 B1 * 9/2019 Kim .................... G06V 10/454
10,984,290 B1 * 4/2021 Goel .................... G06N 20/00
(Continued)

FOREIGN PATENT DOCUMENTS

CN 106461774 A * 2/2017 ............. G01S 13/86
CN 111126269 A * 5/2020 ......... G06K 9/00201
(Continued)

OTHER PUBLICATIONS

Beyond Bounding Boxes: Using Bounding Shapes for Real-Time 3D Vehicle Detection from Monocular RGB Images, Nils Gahlert et al, IEEE, 2019, pp. 675-685 (Year: 2019).*
(Continued)

*Primary Examiner* — Jayesh A Patel
(74) *Attorney, Agent, or Firm* — Joseph Kolodka

(57) ABSTRACT

A method provided for 3D object localization predicts pairs of 2D bounding boxes. Each pair corresponds to a detected object in each of the two consecutive input monocular images. The method generates, for each detected object, a relative motion estimation specifying a relative motion between the two images. The method constructs an object cost volume by aggregating temporal features from the two images using the pairs of 2D bounding boxes and the relative motion estimation to predict a range of object depth candidates and a confidence score for each object depth candidate and an object depth from the object depth candidates. The method updates the relative motion estimation based on the object cost volume and the object depth to provide a refined object motion and a refined object depth. The method reconstructs a 3D bounding box for each detected object based on the refined object motion and refined object depth.

20 Claims, 7 Drawing Sheets

(51) Int. Cl.
  *B60W 30/095* (2012.01)
  *G06F 18/21* (2023.01)
  *G06T 7/215* (2017.01)
  *G06T 7/246* (2017.01)
  *G08G 1/16* (2006.01)

(52) U.S. Cl.
  CPC .............. *G06T 7/215* (2017.01); *G06T 7/251* (2017.01); *G08G 1/166* (2013.01); *B60W 2554/40* (2020.02); *G06T 2207/20084* (2013.01); *G06T 2207/30261* (2013.01)

(56) References Cited

U.S. PATENT DOCUMENTS

| | | | |
|---|---|---|---|
| 11,195,305 B2* | 12/2021 | Miyahara | G06T 7/579 |
| 11,610,423 B2* | 3/2023 | Mao | G06V 10/25 |
| 2014/0037136 A1* | 2/2014 | Ramalingam | G06T 7/73 |
| | | | 382/103 |
| 2014/0195138 A1* | 7/2014 | Stelzig | G08G 1/0116 |
| | | | 701/119 |
| 2014/0270484 A1* | 9/2014 | Chandraker | G06T 7/246 |
| | | | 382/154 |
| 2015/0254834 A1* | 9/2015 | Chandraker | G06T 7/20 |
| | | | 382/154 |
| 2016/0140400 A1* | 5/2016 | Chandraker | G06T 7/579 |
| | | | 348/149 |
| 2017/0316578 A1* | 11/2017 | Fua | G06T 7/246 |
| 2019/0102677 A1* | 4/2019 | Kim | G06T 7/13 |
| 2019/0228504 A1* | 7/2019 | Tong | G06T 5/003 |
| 2019/0311485 A1* | 10/2019 | Buczko | G06T 7/97 |
| 2019/0317519 A1* | 10/2019 | Chen | G06N 3/045 |
| 2019/0370997 A1* | 12/2019 | Hou | G06T 7/74 |
| 2020/0151905 A1* | 5/2020 | Ricco | G06T 7/70 |
| 2020/0293796 A1* | 9/2020 | Sajjadi Mohammadabadi | G06V 10/751 |
| 2020/0376675 A1* | 12/2020 | Bai | G06T 7/73 |
| 2021/0134002 A1* | 5/2021 | Yao | G06V 20/58 |
| 2021/0174573 A1* | 6/2021 | Itou | G06F 3/167 |
| 2021/0209341 A1* | 7/2021 | Ye | G06T 7/73 |
| 2021/0209785 A1* | 7/2021 | Unnikrishnan | G01S 7/41 |
| 2021/0209797 A1* | 7/2021 | Lee | G06T 17/00 |
| 2021/0237761 A1* | 8/2021 | Das | G06T 7/20 |
| 2021/0295013 A1* | 9/2021 | Ye | G06V 20/58 |
| 2021/0397855 A1* | 12/2021 | Guizilini | G06T 7/50 |
| 2022/0012466 A1* | 1/2022 | Taghavi | G06F 18/2163 |
| 2022/0012503 A1* | 1/2022 | Peppoloni | G06T 7/97 |
| 2022/0012899 A1* | 1/2022 | Peppoloni | G06T 7/246 |
| 2022/0188554 A1* | 6/2022 | Huang | G01S 13/931 |
| 2023/0367318 A1* | 11/2023 | Zeng | G05D 1/0217 |

FOREIGN PATENT DOCUMENTS

| | | | | |
|---|---|---|---|---|
| CN | 111145139 A | * | 5/2020 | ......... G06K 9/00208 |
| DE | 102020003465 A1 | * | 8/2020 | |
| EP | 3594902 A1 | * | 1/2020 | ......... G06K 9/00201 |
| WO | WO-2017139516 A1 | * | 8/2017 | .......... G05D 1/0088 |
| WO | WO-2020131467 A1 | * | 6/2020 | ......... G06K 9/00778 |

OTHER PUBLICATIONS

End-to-end Learning for Inter-Vehicle Distance and Relative Velocity Estimation in ADAS with a Monocular Camera, Zhenbo Song et al., IEEE, 2020, pp. 11081-11087 (Year: 2020).*

A Survey on 3D Object Detection Methods for Autonomous Driving Applications, Eduardo Arnold et al., IEEE, 2019, pp. 3782-3795 (Year: 2019).*

Optical-Flow Based Detection of Moving Objects in Traffic Scenes, Erlangung der Doktorwürde et al., DISSERTATION, 2008, pp. 1-120 (Year: 2008).*

Monocular Visual Object 3D Localization in Road Scenes, Yizhou Wang et al., #d Visual Processing, Oct. 2019, pp. 917-925 (Year: 2019).*

Real-time Detection of Moving Vehicles using Dense Stereo Objects from Moving and Optical Flow, Ashit Talukder et al., IEEE, 2004, pp. 3718-3725 (Year: 2004).*

Joint SFM and Detection Cues for Monocular 3D Localization in Road Scenes, Shiyu Song, CVPR, 2015, pp. 3734-3742 (Year: 2015).*

Mousavian, Arsalan, et al. "3D bounding box estimation using deep learning and geometry", In2017 IEEE Conference on Computer Vision and Pattern Recognition (CVPR). Jul. 1, 2017, pp. 1-9.

Qin, Zengyi, et al. "MonoGRNet: a geometric reasoning network for monocular 3D object localization", InProceedings of the AAAI Conference on Artificial Intelligence, vol. 33, No. 1. Jul. 17, 2019, pp. 8851-8858.

Simonelli, Andrea, et al. "Disentangling monocular 3D object detection", Proceedings of the IEEE/CVF International Conference on Computer Vision (ICCV). Oct. 1, 2019, pp. 1991-1999.

Hu, Hou-Ning, et al. "Joint monocular 3D vehicle detection and tracking", InProceedings of the IEEE/CVF International Conference on Computer Vision 2019. Oct. 1, 2019, pp. 5390-5399.

Ren, Shaoqing, et al. "Faster R-CNN: towards real-time object detection with region proposal networks", Advances in neural information processing systems (NeurIPS). Jun. 2015, pp. 1-9.

* cited by examiner

MONOCULAR 3D OBJECT LOCALIZATION FROM TEMPORAL AGGREGATION

RELATED APPLICATION INFORMATION

This application claims priority to U.S. Provisional Patent Application No. 63/072,428, filed on Aug. 31, 2020, incorporated herein by reference in its entirety.

BACKGROUND

Technical Field

The present invention relates to object localization and more particularly to monocular object localization from temporal aggregation.

Description of the Related Art

Localizing objects in 3D space is an important problem due to its numerous real-world applications, such as self-driving, robotic manipulation, and augmentation reality. Most existing 3D object localization methods take one monocular image as input and regress the 3D targets. However, distance estimation from one single image is known to be ill-posed, so the performance of these monocular methods is much worse than those using stereo images or LiDAR points. A few other methods utilize temporal information, but they focus on 3D object tracking rather than improving the 3D object localization accuracy.

SUMMARY

According to aspects of the present invention, a computer-implemented method is provided for three-dimensional (3D) object localization. The method includes predicting, by a joint object detection mechanism that applies an optical flow model to two consecutive input monocular images, pairs of two-dimensional (2D) bounding boxes. Each of the pairs corresponds to a respective one of detected objects in each of the two consecutive input monocular images. The method further includes generating, for each of the detected objects using geometric constraints, a relative motion estimation specifying a relative motion between the two consecutive input monocular images. The method also includes constructing an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates. The method additionally includes updating, by a recurrent refinement loop of a Gated Recurrent Unit (GRU), the relative motion estimation based on the object cost volume and the object depth to provide a refined object motion and a refined object depth. The method further includes reconstructing a 3D bounding box for each of the detected objects based on the refined object motion and the refined object depth, the 3D bounding box predicting a 3D object size, a 3D object position and an object yaw angle.

According to other aspects of the present invention, a computer program product is provided for three-dimensional (3D) object localization. The computer program product includes a non-transitory computer readable storage medium having program instructions embodied therewith. The program instructions are executable by a computer to cause the computer to perform a method. The method includes predicting, by a hardware processor implementing a joint object detection mechanism that applies an optical flow model to two consecutive input monocular images, pairs of two-dimensional (2D) bounding boxes. Each of the pairs corresponds to a respective one of detected objects in each of the two consecutive input monocular images. The method further includes generating, by the hardware processor for each of the detected objects using geometric constraints, a relative motion estimation specifying a relative motion between the two consecutive input monocular images. The method also includes constructing, by the hardware processor, an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates. The method additionally includes updating, by a recurrent refinement loop of a Gated Recurrent Unit (GRU) formed using the hardware processor, the relative motion estimation based on the object cost volume and the object depth to provide a refined object motion and a refined object depth. The method further includes reconstructing, by the hardware processor, a 3D bounding box for each of the detected objects based on the refined object motion and the refined object depth, the 3D bounding box predicting a 3D object size, a 3D object position and an object yaw angle.

According to yet other aspects of the present invention, a computer processing system is provided for three-dimensional (3D) object localization. The computer processing system includes a memory device for storing program code. The computer processing system further includes a hardware processor operatively coupled to the memory device for running the program code to predict, using a joint object detection mechanism that applies an optical flow model to two consecutive input monocular images, pairs of two-dimensional (2D) bounding boxes. Each of the pairs corresponds to a respective one of detected objects in each of the two consecutive input monocular images. The hardware processor further runs the program code to generate, for each of the detected objects using geometric constraints, a relative motion estimation specifying a relative motion between the two consecutive input monocular images. The hardware processor also runs the program code to construct an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates. The hardware processor additionally runs the program code to update, using a recurrent refinement loop of a Gated Recurrent Unit (GRU), the relative motion estimation based on the object cost volume and the object depth to provide a refined object motion and a refined object depth. The hardware processor further runs the program code to reconstruct a 3D bounding box for each of the detected objects based on the refined object motion and the refined object depth, the 3D bounding box predicting a 3D object size, a 3D object position and an object yaw angle.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
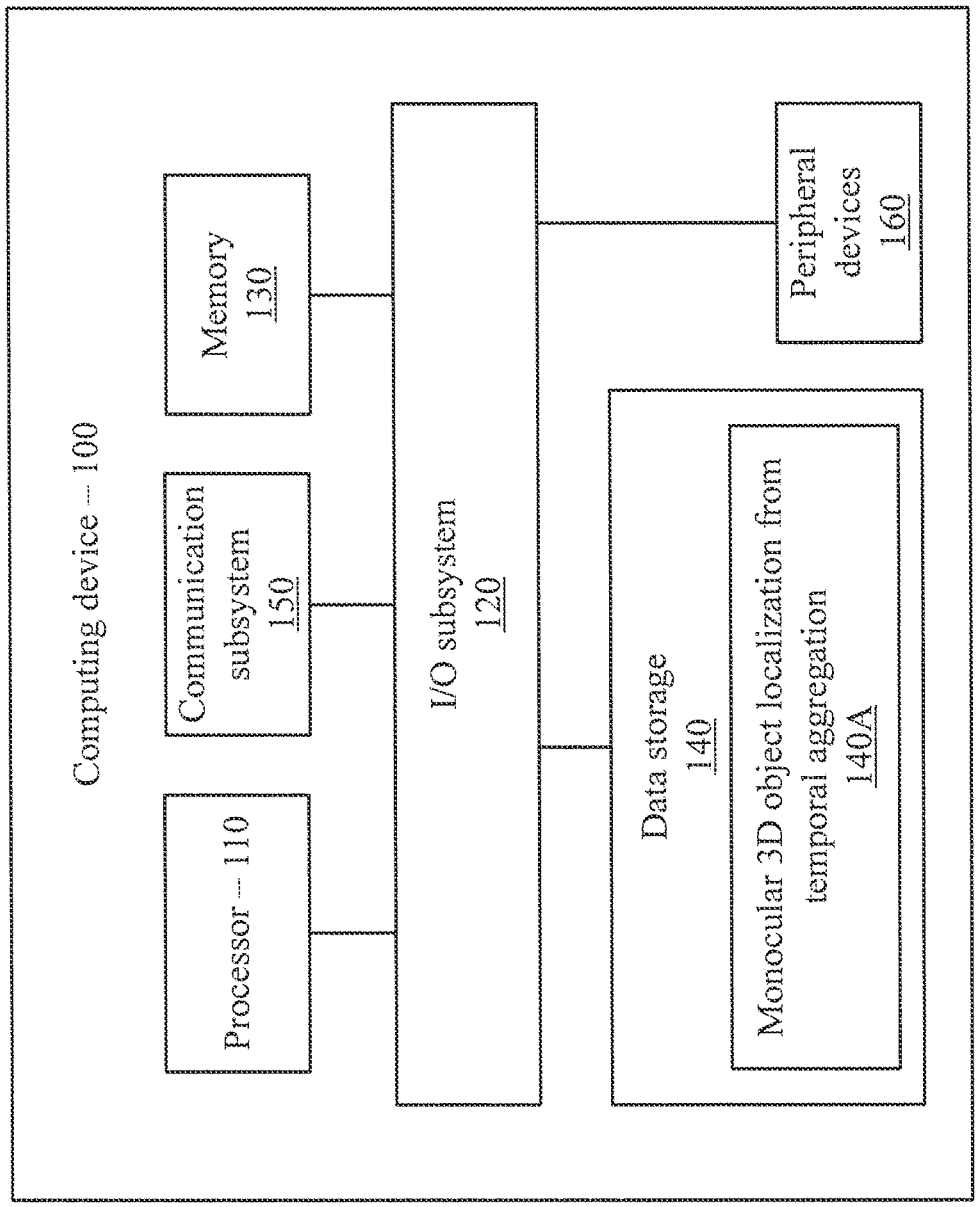
FIG. 1 is a block diagram showing an exemplary computing device, in accordance with an embodiment of the present invention.

Embodiments of the present invention are directed to monocular object localization from temporal aggregation.

Embodiments of the present invention address the problem of 3D object localization using monocular images. Specifically, embodiments of the present invention can predict the 3D object size (width w, height h, length l), 3D object position (x, y, z) and object yaw angle (a) from two or more consecutive monocular images. Without loss of generality, the present invention is described with two consecutive images as input, although more than two images can be used in other embodiments.

Embodiments of the present invention fully utilize temporal information and motion cues in monocular images to achieve accurate 3D object localization. To this end, a novel joint object proposal mechanism is first proposed that simultaneously predicts pairs of 2D bounding boxes for two consecutive frames. Given a pair of 2D bounding boxes, their relative motion is estimated using geometric constraints. With the relative motion, it is further proposed to construct a novel object cost volume module that builds matching costs over a range of depth candidates and predicts a confidence score for each candidate. Finally, the depth prediction for each 3D object can be refined from the object cost volume, which leads to improved 3D object localization.

Embodiments of the present invention can be considered to include the following two main parts: (i) a new joint object proposal mechanism for 2D object detection; and (ii) a new object cost volume module for 3D object distance estimation.

The proposed joint object mechanism aims to simultaneously generate pairs of 2D bounding boxes for two consecutive frames and thus bypass the object association/tracking step in traditional methods. Given two consecutive images, first their optical flow is computed using a pre-trained flow model. The optical flow is then used to translate the anchor bounding boxes of the current frame to the previous frame so that the anchors in two frames are paired together. The corresponding Convolutional Neural Network (CNN) features (through optical flow) are concatenated together to build the common anchor classifier (to determine one anchor is positive or negative). By the paired anchors and concatenated features, joint object proposals are achieved in the sense that 2D object bounding box proposals will be generated in pairs as they are associated to the paired anchors.

With a pair of 3D bounding boxes in the consecutive frames, their relative motion can be estimated using geometric constraints. Afterwards, the proposed object cost volume is constructed to predict accurate object distance. Concretely, a depth range of the 3D bounding boxes (e.g., 0-80 meters) is first predefined and a fixed number of possible depth values are enumerated within the range. Given the network predicted 3D targets (i.e., 3D dimensions, yaw angles) and each depth value, a 3D bounding box can then be built for the current frame and the projected 2D box calculated on the current image plane. With the relative motion, the 3D bounding box for the current frame can be transformed to the coordinate system of the previous frame and projected onto the previous image to get the 2D box. To build the object cost volume, the CNN features are pooled using the corresponding projected 2D boxes on the current and previous images and concatenated to form a cost volume tensor. After applying a series of CNN layers, the cost volume translates to a set of confidence scores for the depth candidates. The final depth prediction is computed as the weighted sum of the confidence scores and depth values, which is essentially a soft argmin operator.

In embodiments of the present invention, the CNN is trained to predict 2D targets (2D bounding boxes) and 3D targets (3D size, yaw angel, depth) with L-1 losses.

FIG. 1 is a block diagram showing an exemplary computing device 100, in accordance with an embodiment of the present invention. The computing device 100 is configured to perform monocular 3D object localization from temporal aggregation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for monocular 3D object localization from temporal aggregation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
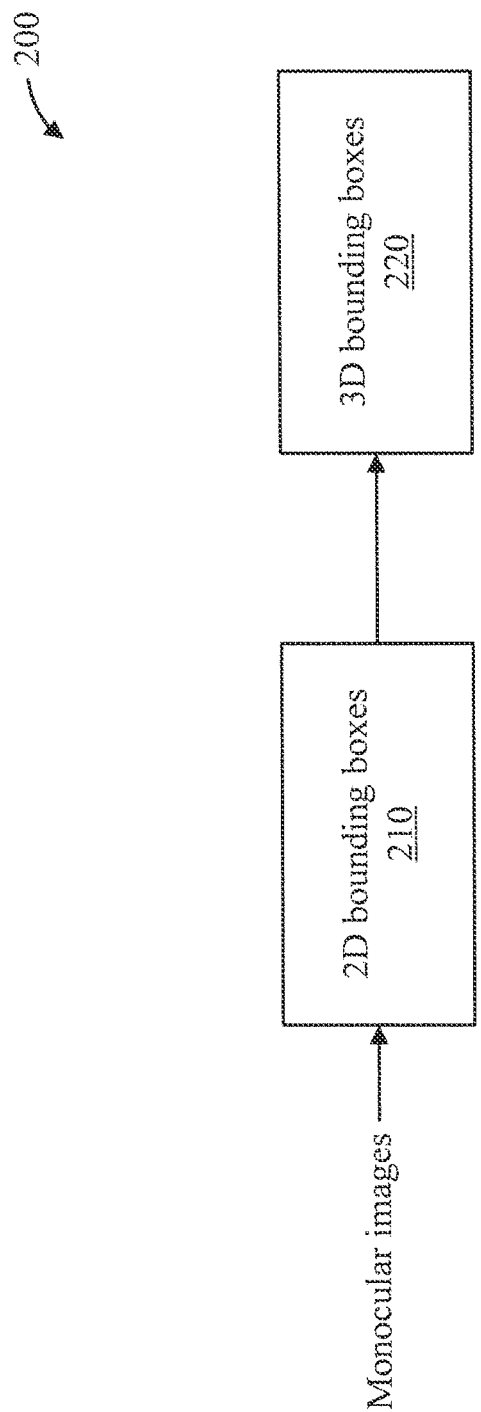
FIG. 2 is a block diagram showing an exemplary system pipeline for 3D object localization, in accordance with an embodiment of the present invention.

These and other variations of a hardware processor subsystem are also contemplated in accordance with embodiments of the present invention FIG. 2 is a block diagram showing an exemplary system pipeline 200 for 3D object localization, in accordance with an embodiment of the present invention.

In an embodiment, the 3D object localization method includes two steps: given a sequence of monocular images, 2D object detection is first performed on the images to obtain 2D bounding boxes 210; after that, the 2D bounding boxes are lifted to 3D bounding boxes 220 by regressing the 3D targets, including 3D bounding box dimensions (w, h, l), 3D object position (x, y, z), and object yaw angle ($\alpha$).

Figure 3:
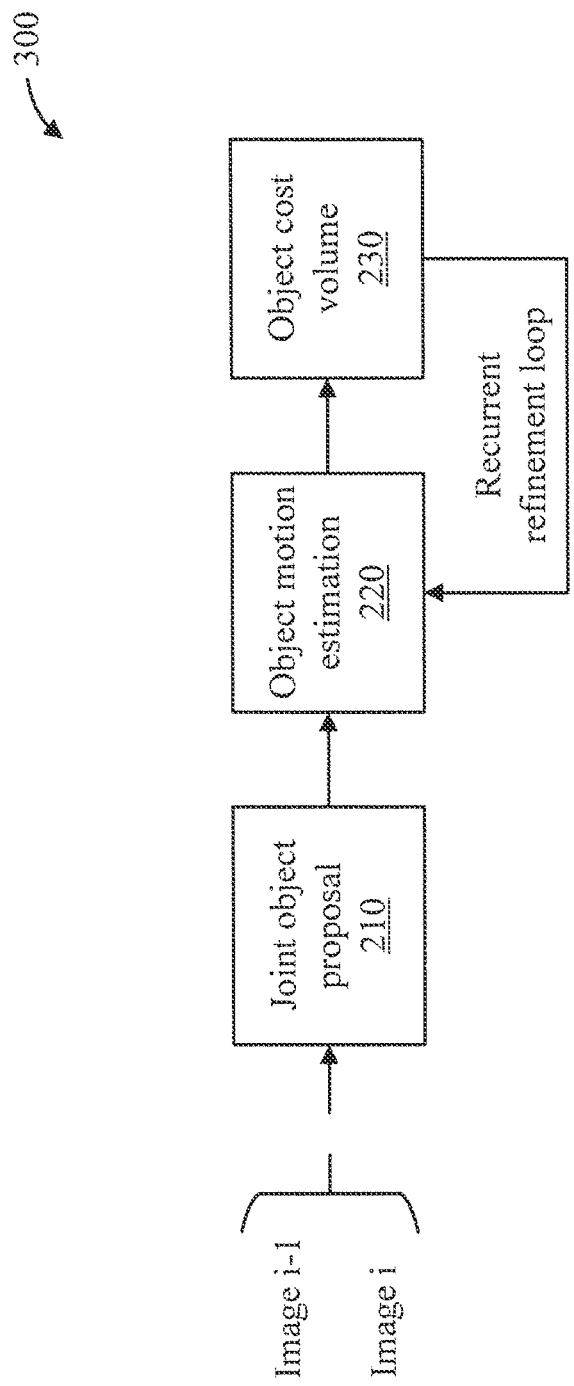
FIG. 3 is a block diagram showing an exemplary framework for 3D object localization, in accordance with an embodiment of the present invention.

FIG. 3 is a block diagram showing an exemplary framework 300 for 3D object localization, in accordance with an embodiment of the present invention.

The framework 300 takes two consecutive images as input and predicts 3D poses (bounding boxes) for detected objects. The joint object proposal mechanism 310 is used to predict pairs of 2D bounding boxes from two consecutive images. For each detected object, its relative motion is then estimated 320 between the two images, and it is used to aggregate temporal features from the previous image to construct the object cost volume 330. The object cost volume 330 helps to refine the object depth, and with that motion estimation can be updated. Through the use of a Gated Recurrent Unit (GRU), a recurrent refinement loop 340 is formed to iteratively improve object motion and depth, and meanwhile facilitate end-to-end training.

Figure 4:
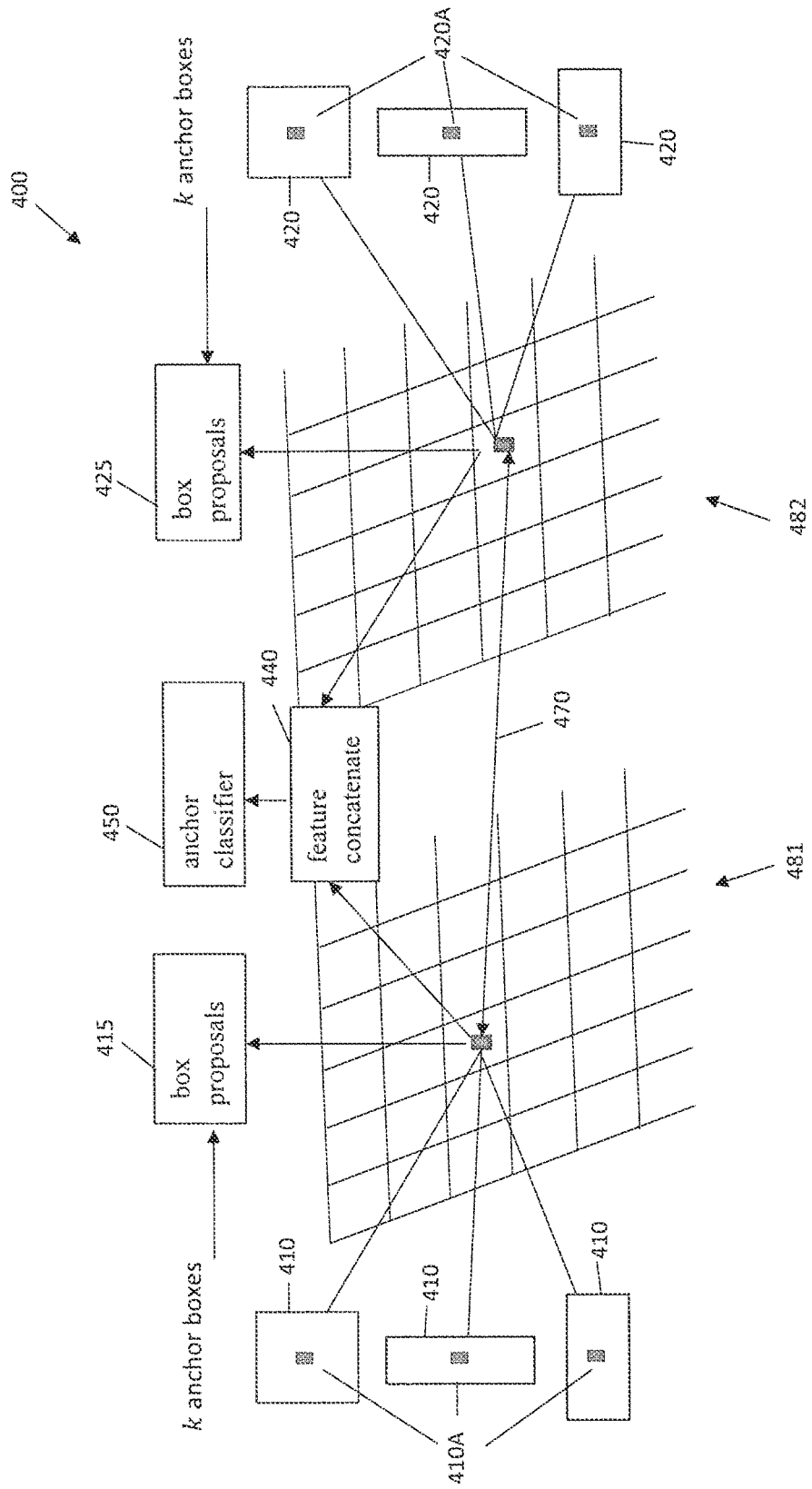
FIG. 4 is a block diagram showing an exemplary joint object proposal mechanism, in accordance with an embodiment of the present invention.

FIG. 4 is a block diagram showing an exemplary joint object proposal mechanism 400, in accordance with an embodiment of the present invention.

Given two consecutive images, their optical flow is first computer using a pre-trained flow model. The optical flow 470 is then used to translate the anchor bounding box centers 410A of k anchor boxes 410 as box proposals 415 on the current frame (image i) to anchor bounding box centers 420A of k anchor boxes 420 as box proposals 425 of the previous frame (image i−1) so that the anchors 410 and 420 in the two images are paired together. This is done using the convolutional feature map 481 for image i−1 and the convolutional feature map 482 for image i. Also, the corresponding CNN features (through optical flow) are concatenated 440 to build the common anchor classifier 450 (to determine one anchor is positive or negative). By the paired anchors and the common anchor classifier 450, joint object proposals are achieved in the sense that 2D object bounding box proposals will be generated in pairs as they are associated to the paired anchors.

Figure 5:
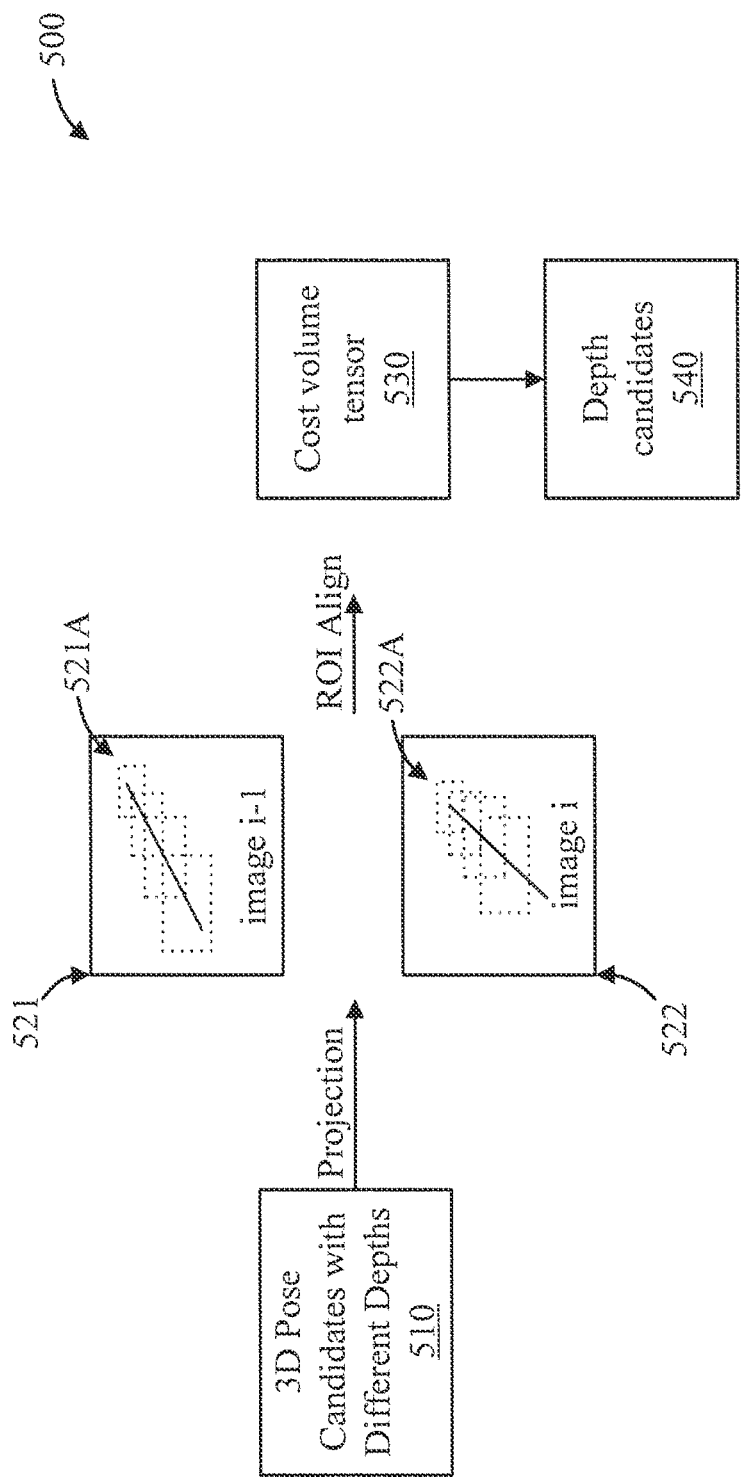
FIG. 5 is a block diagram showing an exemplary object cost volume, in accordance with an embodiment of the present invention.

FIG. 5 is a block diagram showing an exemplary object cost volume 500, in accordance with an embodiment of the present invention.

A depth range of the 3D bounding boxes (e.g., 0-80 meters) is first predefined and a fixed number of possible depth values are enumerated within the range. Given the network predicted 3D targets (i.e., 3D dimensions, yaw angles) and each depth value, a 3D bounding box can be built for the current frame and the projected 2D box calculated on the current image plane. With the relative motion and 3D pose candidates with different depths 510, the 3D bounding box for the current frame 522 can be transformed to the coordinate system of the previous frame 521 and projected onto the previous image to get the 2D box. To build the object cost volume, the CNN features are pooled using the corresponding projected 2D boxes 522A and 521A on the current 522 and previous images 521 and are concatenated along the channel dimension to form a cost volume tensor 530. A series of CNN layers are then applied to the cost volume tensor and the channel dimension collapses to one after the final convolutional layer. Afterwards, a softmax operator is applied along the depth enumerations, which essentially turns the cost volume 530 into a set of confidence scores for the depth candidates 540. The final depth prediction is computed as the weighted sum of the confidence scores and depth values, which is essentially a soft argmin operator.

Figure 6:
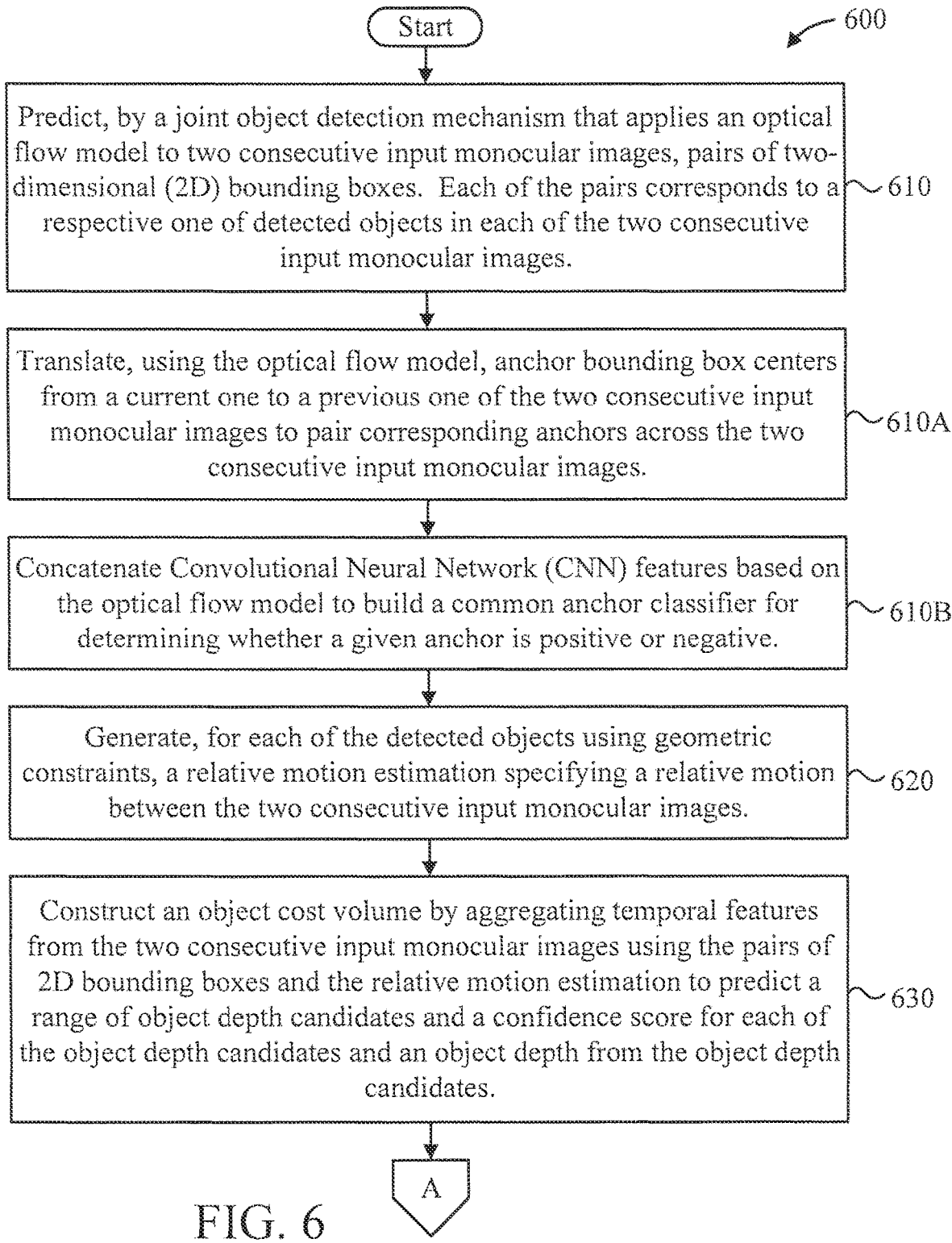
FIGS. 6-7 are flow diagrams showing an exemplary method for three-dimensional (3D) object localization, in accordance with an embodiment of the present invention.
Figure 7:
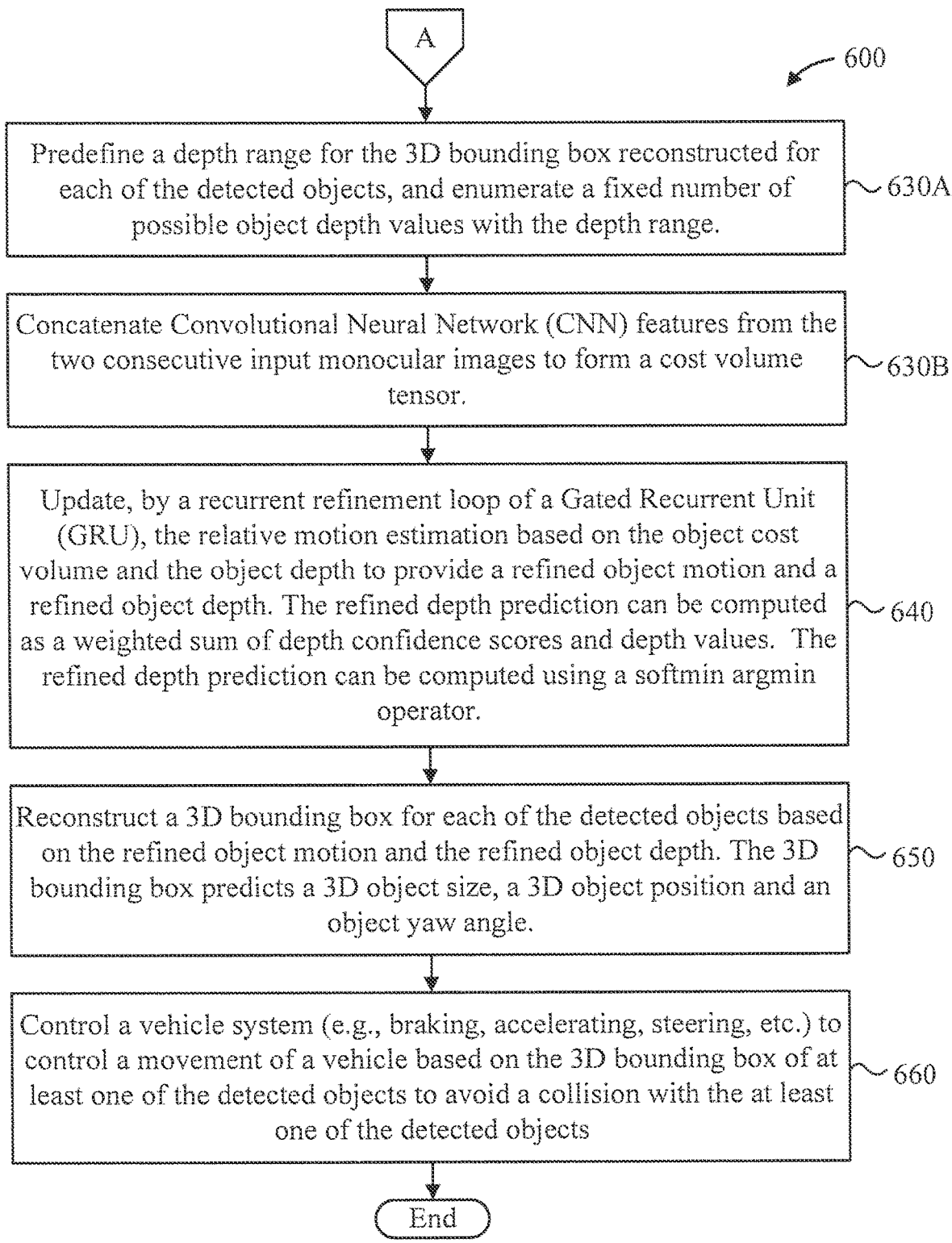

FIGS. 6-7 are flow diagrams showing an exemplary method 600 for three-dimensional (3D) object localization, in accordance with an embodiment of the present invention.

At block 610, predict, by a joint object detection mechanism that applies an optical flow model to two consecutive input monocular images, pairs of two-dimensional (2D) bounding boxes. Each of the pairs corresponds to a respective one of detected objects in each of the two consecutive input monocular images.

In an embodiment, block 610 can include one or more of blocks 610A and 610B.

At block 610A, translate, using the optical flow model, anchor bounding box centers from a current one to a previous one of the two consecutive input monocular images to pair corresponding anchors across the two consecutive input monocular images.

At block 610B, concatenate Convolutional Neural Network (CNN) features based on the optical flow model to build a common anchor classifier for determining whether a given anchor is positive or negative.

At block 620, generate, for each of the detected objects using geometric constraints, a relative motion estimation specifying a relative motion between the two consecutive input monocular images.

At block 630, construct an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates.

In an embodiment, block 630 can include one or more of blocks 630A and 630B.

At block 630A, predefine a depth range for the 3D bounding box reconstructed for each of the detected objects, and enumerate a fixed number of possible object depth values with the depth range.

At block 630B, concatenate Convolutional Neural Network (CNN) features from the two consecutive input monocular images to form a cost volume tensor.

At block 640, update, by a recurrent refinement loop of a Gated Recurrent Unit (GRU), the relative motion estimation based on the object cost volume and the object depth to provide a refined object motion and a refined object depth. In an embodiment, the refined depth prediction can be computed as a weighted sum of depth confidence scores and depth values. In an embodiment, the refined depth prediction can be computed using a soft argmin operator.

At block 650, reconstruct a 3D bounding box for each of the detected objects based on the refined object motion and the refined object depth. The 3D bounding box predicts a 3D object size, a 3D object position and an object yaw angle.

At block 660, control a vehicle system (e.g., braking, accelerating, steering, etc.) to control a movement of a vehicle based on the 3D bounding box of at least one of the detected objects to avoid a collision with the at least one of the detected objects.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for three-dimensional (3D) object localization, comprising:
   predicting, by a joint object detection mechanism that applies an optical flow model to two consecutive input monocular images, pairs of two-dimensional (2D) bounding boxes, each of the pairs corresponding to a respective one of detected objects in each of the two consecutive input monocular images;

generating, for each of the detected objects using geometric constraints, a relative motion estimation specifying a relative motion between the two consecutive input monocular images;

constructing an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates;

updating, by a recurrent refinement loop of a Gated Recurrent Unit (GRU), the relative motion estimation based on the object cost volume and the object depth to provide a refined object motion and a refined object depth; and reconstructing a 3D bounding box for each of the detected objects based on the refined object motion and the refined object depth, the 3D bounding box predicting a 3D object size, a 3D object position and an object yaw angle.

2. The computer-implemented method of claim 1, wherein said predicting step comprises translating, using the optical flow model, anchor bounding box centers from a current one to a previous one of the two consecutive input monocular images to pair corresponding anchors across the two consecutive input monocular images.

3. The computer-implemented method of claim 2, wherein said predicting step comprises concatenating Convolutional Neural Network (CNN) features based on the optical flow model to build a common anchor classifier for determining whether a given anchor is positive or negative.

4. The computer-implemented method of claim 1, wherein said constructing step comprises:
predefining a depth range for the 3D bounding box reconstructed for each of the detected objects; and
enumerating a fixed number of possible object depth values with the depth range.

5. The computer-implemented method of claim 1, wherein said constructing step comprises concatenating Convolutional Neural Network (CNN) features from the two consecutive input monocular images to form a cost volume tensor.

6. The computer-implemented method of claim 1, wherein the refined object depth updating is computed as a weighted sum of depth confidence scores and depth values.

7. The computer-implemented method of claim 1, wherein the refined object depth updating is computed using a soft argmin operator.

8. The computer-implemented method of claim 1, wherein the recurrent refinement loop of the GRU iteratively improves the refined object motion and the refined object depth.

9. The computer-implemented method of claim 1, further comprising controlling a movement of a vehicle based on the 3D bounding box of at least one of the detected objects to avoid a collision with the at least one of the detected objects.

10. A computer program product for three-dimensional (3D) object localization, the computer program product comprising a non-transitory computer readable storage medium having program instructions embodied therewith, the program instructions executable by a computer to cause the computer to perform a method comprising:

predicting, by a hardware processor implementing a joint object detection mechanism that applies an optical flow model to two consecutive input monocular images, pairs of two-dimensional (2D) bounding boxes, each of the pairs corresponding to a respective one of detected objects in each of the two consecutive input monocular images;

generating, by the hardware processor for each of the detected objects using geometric constraints, a relative motion estimation specifying a relative motion between the two consecutive input monocular images;

constructing, by the hardware processor, an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates;

updating, by a recurrent refinement loop of a Gated Recurrent Unit (GRU) formed using the hardware processor, the relative motion estimation based on the object cost volume and the object depth to provide a refined object motion and a refined object depth; and reconstructing, by the hardware processor, a 3D bounding box for each of the detected objects based on the refined object motion and the refined object depth, the 3D bounding box predicting a 3D object size, a 3D object position and an object yaw angle.

11. The computer program product of claim 10, wherein said predicting step comprises translating, using the optical flow model, anchor bounding box centers from a current one to a previous one of the two consecutive input monocular images to pair corresponding anchors across the two consecutive input monocular images.

12. The computer program product of claim 11, wherein said predicting step comprises concatenating Convolutional Neural Network (CNN) features based on the optical flow model to build a common anchor classifier for determining whether a given anchor is positive or negative.

13. The computer program product of claim 10, wherein said constructing step comprises:
predefining a depth range for the 3D bounding box reconstructed for each of the detected objects; and
enumerating a fixed number of possible object depth values with the depth range.

14. The computer program product of claim 10, wherein said constructing step comprises concatenating Convolutional Neural Network (CNN) features from the two consecutive input monocular images to form a cost volume tensor.

15. The computer program product of claim 10, wherein the refined object depth updating is computed as a weighted sum of depth confidence scores and depth values.

16. The computer program product of claim 10, wherein the refined object depth updating is computed using a soft argmin operator.

17. The computer program product of claim 10, wherein the recurrent refinement loop of The GRU iteratively improves the refined object motion and the refined object depth.

18. The computer program product of claim 10, wherein the method further comprises controlling a movement of a vehicle based on the 3D bounding box of at least one of the detected objects to avoid a collision with the at least one of the detected objects.

19. A computer processing system for three-dimensional (3D) object localization, comprising:
   a memory device for storing program code; and
   a hardware processor operatively coupled to the memory device for running the program code to
      predict, using a joint object detection mechanism that applies an optical flow model to two consecutive input monocular images, pairs of two-dimensional (2D) bounding boxes, each of the pairs corresponding to a respective one of detected objects in each of the two consecutive input monocular images;
      generate, for each of the detected objects using geometric constraints, a relative motion estimation specifying a relative motion between the two consecutive input monocular images;
      construct an object cost volume by aggregating temporal features from the two consecutive input monocular images using the pairs of 2D bounding boxes and the relative motion estimation to predict a range of object depth candidates and a confidence score for each of the object depth candidates and an object depth from the object depth candidates;
      update, using a recurrent refinement loop of a Gated Recurrent Unit (GRU), the relative motion estimation based on the object cost volume and the object depth to provide a refined object motion and a refined object depth; and
      reconstruct a 3D bounding box for each of the detected objects based on the refined object motion and the refined object depth, the 3D bounding box predicting a 3D object size, a 3D object position and an object yaw angle.

20. The computer processing system of claim 19, wherein the refined object depth update is computed as a weighted sum of depth confidence scores and depth values.

* * * * *